July 3, 1956 R. W. AYLING 2,753,198
SEAL FOR A ROTATING SHAFT
Filed Feb. 4, 1953

INVENTOR.
Robert W. Ayling
BY Herman Seid
atty.

United States Patent Office 2,753,198
Patented July 3, 1956

2,753,198

SEAL FOR A ROTATING SHAFT

Robert W. Ayling, Utica, N. Y., assignor to Carrier Corporation, Syracuse, N. Y., a corporation of Delaware Application February 4, 1953, Serial No. 335,116

4 Claims. (Cl. 286—11)

This invention relates to a fluid seal, and more particularly, to a seal for use with a rotating shaft placed in a stationary housing to prevent leakage of fluids into or out of the housing.

The chief object of this invention is to provide a seal to prevent leakage of fluids into or out of a stationary housing containing a rotating shaft.

Another object is to provide a seal sub-assembly adapted to be positioned as a unit to seal the rotating shaft of a compressor or other similar structure. Other objects of my invention will be readily perceived from the following description.

This invention relates to a fluid seal including in combination with a rotatable shaft and a rotatable seal member, a stationary seal member surrounding said shaft, an element surrounding said shaft and being spaced therefrom, said element at one end being connected to the stationary seal member, means connected to the other end of the element to prevent the stationary seal member from rotating, resilient means adjacent said shaft and disposed between said element and said first means to urge the rotatable seal member into sealing engagement, and a flexible sleeve disposed between the stationary seal member and the stationary means.

The attached drawing illustrates a preferred embodiment of my invention, in which.

Figure 1:
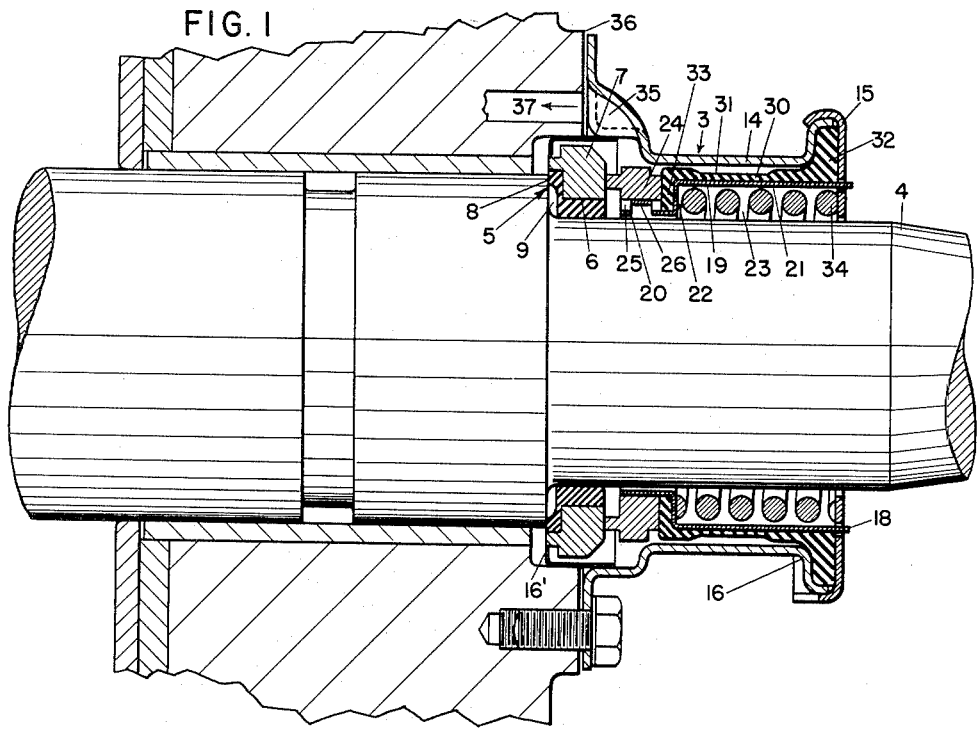
Figure 1 is a sectional view of an embodiment of my invention.

Referring to the drawing and particularly to Figure 1, there is disclosed a seal cartridge 3 attached to a wall of the compressor. The stationary and rotating parts of the seal are disposed within the cartridge to form a unitary assembly.

Figure 3:
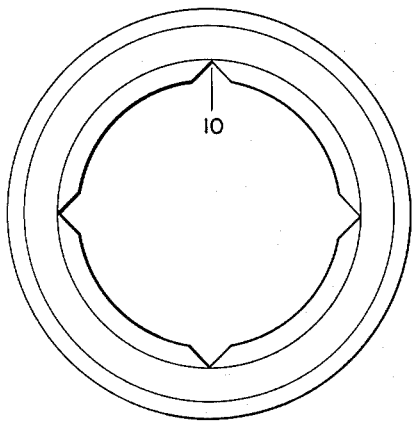
Figure 3 is an end view of the rotating seal member.
Figure 2:
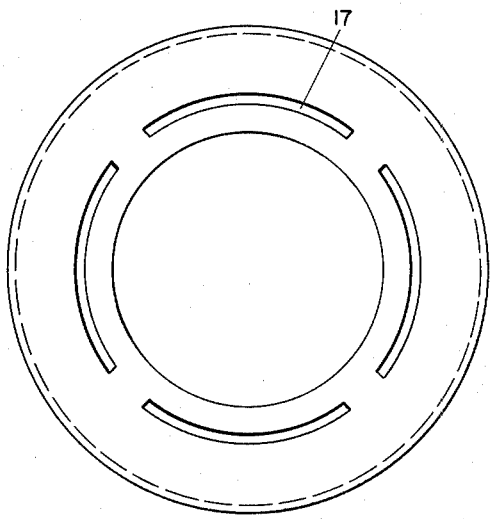
Figure 2 is an end view of the seal cover.

The seal is shown surrounding a shaft 4 but it is understood the shaft is not a part of the unitary assembly. An annular rotating seal member 5 surrounds the shaft 4 and is driven therefrom by means of a press fit. This rotating seal member 5 is composed of a rubber portion 6 and a metallic portion 7 bonded thereto. The metallic portion is preferably made of a hardened material such as Nitralloy. The rubber portion is preferably an oil resistant synthetic rubber. The shaft 4 has a shoulder 8 against which the rubber portion 6 of the rotating seal member seals by facial engagement therewith. The rubber portion 6 of the rotating seal member 5 is designed to provide a cavity or recess 9 between the shaft shoulder and the rubber portion. The rubber portion is provided with notches 10, shown in Figure 3, to vent the cavity or recess 9. Thus, if any fluid leaks past the seal formed between the rotating seal member 5 and the shaft shoulder 8 it will be able to escape from the recess or cavity 9 through the notches 10 and will not cause the rotating seal member to be displaced from the shaft shoulder by a build-up of fluid pressure.

The seal cartridge 3 includes a housing 14 which is attached by bolts or other suitable means to the wall of the compressor. A cover 15 is connected to the housing 14 to hold the seal within the housing. This connection preferably is made by providing the cover with a plurality of locking tabs which may be clinched against the flange 16 of housing 14. Other suitable means to connect the cover and the housing may be employed, if desired. A retainer or keeper ring 16' is attached to the housing 14 adjacent its juncture with the wall of the compressor. This ring is preferably attached to the shell by brazing through other suitable means may be employed.

The cover has four notches or slots 17 spaced about it to cooperate with lugs 18 on seal retaining element 19. The element 19 consists of cylindrical portions 20 and 21 joined together by an offset portion 22. It will be seen that a space 23 is provided between the cylindrical portion 21 and the shaft 4. It will also be noted that the lugs 18 are formed in the cylindrical portion 21.

A stationary seal member 24 is in facial engagement with the rotating seal member 5. The stationary seal member 24 is interlocked with the cylindrical portion 20 of element 19 by suitable means. This means, for example, may be indentations 25 in the stationary seal member 24 and protrusions 26 in the cylindrical portion 20 of element 19.

A synthetic elastic member or sleeve 30 surrounds the element 19. The sleeve 30 includes a cylindrical portion 31, and offset portions 32 and 33. The offset portion 32 is placed between the cover 15 and the flange 16 of the housing 14 to form a leak-tight joint. The offset portion 33 is disposed between the stationary seal member 24 and the offset portion 22 of the element 19. This relationship is clearly shown in Figure 1. The synthetic material should be resistant to the halogen refrigerants, ammonia and oil. The synthetic material preferably is polymerized chloroprene or the copolymer of acrylic nitrile and butadiene. Any other synthetic material that is flexible and that has similar properties may be employed.

A spring 34 is positioned in the space 23. This spring is confined between the offset portion 22 of the element 19 and the cover 15. When the seal cartridge 3 is attached to the compressor or other similar structure, the spring 34 will exert its force through the stationary seal member 24 against the rotating seal member 5. Thus, the spring will also urge the rotating seal member 5 into sealing engagement with the shaft shoulder 8. Therefore, sealing is accomplished between the stationary seal member 24 and the rotating seal member 5 and between the rotating seal member 5 and the shaft shoulder 8.

In forming the seal cartridge 3 the keeper ring 16' is brazed to the housing 14. The rotating seal member 5 is then inserted in the housing 14. The stationary seal member 24, the elastic member 30, and the retaining element 19 comprise a sub-assembly, which is inserted in the housing 14 after the rotating seal member 5. To complete the seal cartridge, the spring 34 is inserted and then the cover 15 is attached to the housing 14 to compress the entire assembly. This cartridge is then attached to the wall of the compressor by bolts or other suitable means. It is obvious that the rotating seal member 5 is hidden from view by the housing 14 when the cartridge 3 is assembled on the shaft 4. Thus, it is necessary to be certain of positive seating of the rotating seal member 5 against the shaft shoulder 8. This is accomplished by exerting an axial force against the exposed lugs 18 of element 19. This force is transmitted directly to the rotating seal member 5 to seal it against the shaft shoulder 8.

The oil return in the seal cartridge is shown at 35 and is at the top of the housing to maintain a reservoir of oil therein. When the seal cartridge 3 is connected to the compressor crankcase 36, the oil return 35 of the seal cartridge will be in communication with the oil return 37 in the crankcase. It will be understood that the oil inlet for the seal cartridge is at a position remote from the oil return and preferably at the side of the housing. The maintenance of the oil reservoir in the seal cartridge provides adequate lubrication of the sealing surfaces therein.

An advantage of this invention is that the seal is pressure balanced. This is accomplished by making the outer diameter of the seal nose of the stationary seal member 24 the same as the largest diameter of the shaft of the compressor. This relationship of parts permits all parts which might be moved by an unbalanced pressure to have equal areas exposed on both sides.

The present invention has the advantage of providing a cartridge-type seal that will accommodate end motion of a shaft by being placed normally in compression. Another advantage of this invention is that the flexible sleeve will not tear or be cut by contiguous metal parts and yet is well-supported against pressure forces by those metal parts.

This seal differs from the seals disclosed in my copending application, Serial No. 335,117, filed February 4, 1953, since in this seal only the seat or shoulder rotates with the shaft while the remainder of the seal is stationary.

While I have described a preferred embodiment of my invention, it will be understood that my invention is not limited thereto since it may be otherwise embodied within the scope of the following claims.

I claim:

1. In combination with a rotatable shaft having a shoulder, a seal cartridge comprising a housing for a fluid seal, a cover being connected to the housing to hold the seal within the housing, said fluid seal including a rotatable seal member driven by said shaft, said rotatable seal member being in sealing facial engagement with the shaft shoulder, a stationary seal member in facial engagement with the rotatable seal member, an element including two cylindrical portions and an offset portion connecting the cylindrical portions, one of said cylindrical portions being connected to the stationary seal member adjacent the shaft, the offset portion extending perpendicular to the cylindrical portions and being spaced from the stationary seal member, the second of said cylindrical portions being spaced from the shaft and being connected to the cover to prevent the element and the stationary seal member from rotating, a flexible sleeve member surrounding the element and supported thereby, said sleeve member including a cylindrical portion, said cylindrical portion having an offset portion extending from each end thereof, the cylindrical portion embracing the second cylindrical portion of said element, one of the offset portions being disposed in the space between the stationary seal member and the offset portion of said element, the second offset portion of said sleeve member being disposed between the cover and the housing, and resilient means confined between the offset portion of the element and the cover in the space between the shaft and the second cylindrical portion of the element to urge the stationary seal member into sealing engagement with the rotatable seal member, and the rotatable seal member into sealing engagement with the shaft shoulder.

2. A fluid seal for a rotatable shaft having a shoulder thereon, comprising a rotatable sealing member including a shaft engaging surface and a shoulder sealing surface so situated, thereby defining a cavity at the base of the shoulder, said shaft engaging surface of the rotatable seal being provided with notches which extend axially throughout the entire length of the shaft engaging surface and are connected with the cavity, whereby fluid that may become trapped in said cavity can escape through said notches, a stationary sealing member in sealing engagement with the surface of the rotatable seal opposite the shoulder sealing surface, means for holding the stationary seal in spaced relation to said shaft and means cooperating with said last mentioned means for maintaining the stationary sealing member in engagement with said rotatable sealing member.

3. A fluid seal of the type set forth in claim 2, wherein said notches consist of two pairs of oppositely disposed notches in the shaft engaging surface of said rotatable sealing member.

4. In combination with a rotatable shaft having a shoulder, a seal cartridge comprising a housing for a fluid seal, a cover being connected to the housing to hold the seal within the housing, said fluid seal including a rotatable seal member in facial sealing engagement with the shoulder of the shaft, a stationary seal member adapted for facial sealing contact with the rotatable seal member, holding means attached to the stationary seal member and connected to the cover to restrain relative rotation therebetween, a flexible sleeve member having a first and second portion, said first portion being located between said stationary seal member and said holding means to seal the connection therebetween, said second portion being in sealing engagement with the cover and housing, and biasing means operatively connected to the stationary seal member to urge said stationary seal member into sealing contact with said rotatable seal member.

References Cited in the file of this patent

UNITED STATES PATENTS

| | | |
|---|---|---|
| 2,149,974 | McCormack | Mar. 7, 1939 |
| 2,188,784 | Grothouse | Jan. 30, 1940 |
| 2,489,781 | Isenbarger | Nov. 29, 1949 |
| 2,559,963 | Jensen | July 10, 1951 |
| 2,572,422 | Agger | Oct. 23, 1951 |